United States Patent [19]
Harvey et al.

[11] 4,183,648
[45] Jan. 15, 1980

[54] SYNCHRONIZING MECHANISM FOR FLASH FIRING AND SHUTTER ACTUATION

[75] Inventors: Donald M. Harvey, Webster; Dana W. Wolcott, Brockport, both of N.Y.

[73] Assignee: Eastman Kodak Company, Rochester, N.Y.

[21] Appl. No.: 891,082

[22] Filed: Mar. 29, 1978

[51] Int. Cl.² .............................................. G03B 15/03
[52] U.S. Cl. .................................................. 354/135
[58] Field of Search ............... 354/135, 130, 142, 145, 354/250

[56] References Cited

U.S. PATENT DOCUMENTS

| | | | |
|---|---|---|---|
| 3,397,328 | 8/1968 | Schafft | 310/8.1 |
| 3,500,451 | 3/1970 | Yando | 354/135 X |
| 3,677,153 | 7/1972 | Bok | 354/135 |

FOREIGN PATENT DOCUMENTS 2021402  11/1971  Fed. Rep. of Germany ........... 354/142

*Primary Examiner*—John Gonzales
*Attorney, Agent, or Firm*—Roger A. Fields

[57] ABSTRACT

In a camera, a piezoelectric generator is struck by a hammer to produce an electrical pulse for flash firing. The resulting mechanical shock to the piezoelectric generator is transmitted through the generator to a shutter blade, which is actuated by the shock to initiate a film exposure in synchronization with flash firing.

3 Claims, 1 Drawing Figure

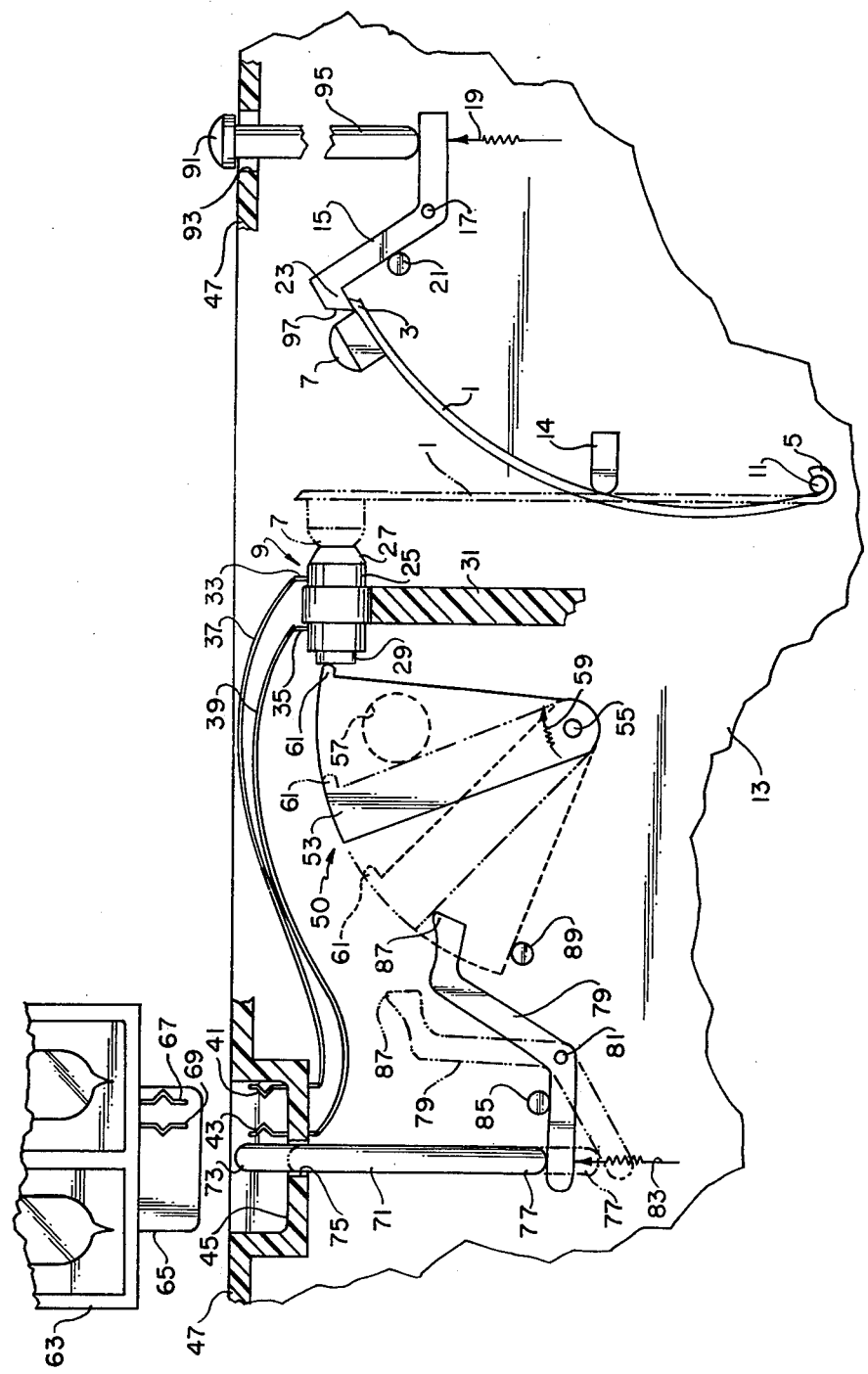

ated with known synchronizing mechanisms for flash firing and shutter actuation are believed solved by the present invention. Specifically, the present invention provides a much simplified synchronizing mechanism which has fewer component parts, improves reliability and can be inexpensively manufactured and assembled. These improvements are achieved in accordance with the present invention by disposing a shutter blade and a piezoelectric generator in mechanical shock transmitting relationship. Consequently, when, for example, the piezoelectric generator is struck by a hammer to generate an electrical pulse for flash firing, the resulting mechanical shock to the piezoelectric generator is transmitted to the shutter blade, actuting the shutter blade to initiate a film exposure in synchronization with flash firing. Since shutter actuation is obtained by using the mechanical shock transmitted through the piezoelectric crystal when struck by the hammer, the need for a separate shutter actuating device as in prior art synchronizing mechanisms is dispensed with. This improvement, therefore, reduces the manufacturing and assembly costs of a camera and enhances the reliability of its synchronizing mechanism for flash firing and shutter actuation.

SYNCHRONIZING MECHANISM FOR FLASH FIRING AND SHUTTER ACTUATION

BACKGROUND OF THE INVENTION

1. Field of the Invention

The present invention relates generally to photographic camera apparatus, and more particularly to synchronizing mechanisms for flash firing and shutter actuation.

2. Description of the Prior Art

It is known in the photographic arts to provide for the firing of a flash lamp by means of an electrical pulse generated by a piezoelectric crystal and to provide for the synchronization of such flash firing with the shutter operation of a camera. For the most part, known synchronizing mechanisms for flash firing and shutter operation have tended to be mechanically complex. For example, as disclosed in U.S. Pat. No. 3,697,142, granted June 6, 1975, a firing spring is unlatched to cause a hammer to strike a piezoelectric crystal, activating the crystal to generate an electrical pulse for flash firing. In proper timed relationship, a high energy lever is unlatched to actuate a shutter blade for initiating a film exposure. This use of separate devices for activating the piezoelectric crystal to fire a flash lamp and for actuating the shutter blade to initiate a film exposure gives rise to reliability problems and increases the manufacturing and assembly costs of a camera.

SUMMARY OF THE INVENTION

The previously described and other problems associated with known synchronizing mechanisms for flash firing and shutter actuation are believed solved by the present invention. Specifically, the present invention provides a much simplified synchronizing mechanism which has fewer component parts, improves reliability and can be inexpensively manufactured and assembled. These improvements are achieved in accordance with the present invention by disposing a shutter blade and a piezoelectric generator in mechanical shock transmitting relationship. Consequently, when, for example, the piezoelectric generator is struck by a hammer to generate an electrical pulse for flash firing, the resulting mechanical shock to the piezoelectric generator is transmitted to the shutter blade, actuting the shutter blade to initiate a film exposure in synchronization with flash firing. Since shutter actuation is obtained by using the mechanical shock transmitted through the piezoelectric crystal when struck by the hammer, the need for a separate shutter actuating device as in prior art synchronizing mechanisms is dispensed with. This improvement, therefore, reduces the manufacturing and assembly costs of a camera and enhances the reliability of its synchronizing mechanism for flash firing and shutter actuation.

BRIEF DESCRIPTION OF THE DRAWING

For a more complete understanding of the present invention, as well as further advantages and features thereof, reference should be had to the following detailed description of the invention taken in conjunction with the accompanying drawing in which there is shown an elevational view of the synchronizing mechansim for flash firing and shutter actuation according to a preferred embodiment of the present invention.

DESCRIPTION OF THE PREFERRED EMBODIMENT

Because cameras are well known, this description will be directed in particular to elements forming part of or cooperating directly with apparatus in accordance with the present invention. It is to be understood that camera elements not specifically shown or described may take various forms known to those skilled in the camera art.

Referring now to the drawing, there is shown a synchronization mechanism for flash firing and shutter actuation in a still picture camera. In the drawing, a piezoelectric firing spring 1 is illustrated in the form of an elongated leaf spring having opposite end portions 3 and 5. Included on one end portion 3 of the firing spring 1 is a hammer 7 for striking a piezoelectric generator indicated generally as 9. When struck in this manner, the piezoelectric generator 9 produces an electrical pulse for flash firing. The other end portion 5 of the firing spring 1 is fixed by a mounting pin 11 to a camera plate 13. A fulcrum 14 for the firing spring 1 is disposed intermediate its opposite end portions 3 and 5 to serve as a support about which the firing spring is flexed.

Provided within the camera is a firing spring latch 15 which is pivotally movable about a mounting pin 17 fixed to the plate 13. The latch 15 is biased by a spring 19 to pivot in a counterclockwise direction, as viewed in the drawing, against a fixed stop 21. When the latch 15 is located against the stop 21, an end portion 23 of the latch is oriented to engage the end portion 3 of the firing spring 1 and, thereby, releasably retain the firing spring in a tensioned or cocked position, shown in the drawing in solid lines. When released by the latch 15, the firing spring 1 swings to a firing or impacting position, shown in the drawing in dash-dotted lines; whereupon, the hammer 7 strikes the piezoelectric generator 9 to produce an electrical pulse for flash firing.

The piezoelectric generator 9 includes a piezoelectric crystal 25 and a pair of opposed anvil end portions 27 and 29 located on either side of the crystal. As shown in the drawing, the piezoelectric generator 9 is mounted within the camera on a rib member 3 which may be fixed to the plate 13. A pair of terminals 33 and 35, secured to the crystal 25, are connected to respective electrical leads 37 and 39 which lead to a pair of resilient electrical contacts 41 and 43. The electrical contacts 41 and 43 are located within a flash-receiving socket or receptacle 45 formed within a top wall 47 of the camera.

A shutter mechanism indicated generally as 50 includes a rebound type shutter blade 53 which is pivotally movable about a mounting pin 55 fixed to the camera plate 13. In the drawing, the shutter blade 53 is shown in solid lines in a closed position, covering an exposure aperture 57, and in dashed-dotted lines and in dashed lines in respective opened positions, uncovering the exposure aperture. The shutter blade 53 is biased by a return spring 59 to pivot in a clockwise direction, as viewed in the drawing, from either of the opened positions to the closed position. In the closed position, the shutter blade 53 is disposed with a nose portion 61 held by the return spring 59 lightly against the anvil end portion 29 of the piezoelectric generator 9.

A flash unit 63 which may take the form of a chemical or electrical flash has a base 65 configured to fit snugly into the flash-receiving socket 45. The base 65 includes a pair of rigid electrical contacts 67 and 69 for making electrical contact respectively with the two resilient electrical contacts 41 and 43 in the flash-receiving socket 45, in order to electrically couple the flash unit 63 to the piezoelectric crystal 25. As viewed in the drawing, a rod 71 which is supported for vertical movement by appropriate means (not shown) has an upper end portion 73 projecting through an opening 75 in the flash-receiving socket 45. A lower end portion 77 of the rod 71 rests against an adjustable rebound stop 79 for the shutter blade 53. The adjustable rebound stop 79 is pivotally movable about a mounting pin 81, fixed to the camera plate 13, and is biased by a spring 83 to pivot in a clockwise direction, as viewed in the drawing, against a fixed stop 85. In the drawing, the adjustable rebound stop 79 is shown in solid lines in a non-flash position in which a nose portion 87 of the adjustable stop is located in the arcuate path of the shutter blade 53. Thus, in the non-flash position, the adjustable rebound stop 79 operates to prevent the shutter blade 53 from reaching a fixed rebound stop 89 and, thereby, reduces the exposure interval. When, however, the flash unit 63 is inserted in the the flash-receiving socket 45, the flash base 65 depresses the rod 71, which pivots the adjustable rebound stop 79 in a counterclockwise direction about its mounting pin 81 to a flash position, shown in dashed-dotted lines. In the flash position, the nose portion 87 of the adjustable rebound stop 79 is removed from the arcuate path of the shutter blades 53. This permits further travel of the shutter blade 53 to the fixed rebound stop 89, increasing the exposure interval.

When the camera is set or cocked for a picture-taking operation, as shown in the drawing, and it is desired to initiate a film exposure, a shutter release button 91, adjacent an opening 93 in the top wall 47 of the camera, is manually depressed. This causes a pin member 95, which depends from the shutter release button 91 through the wall opening 93, to pivot the latch 15 in a clockwise direction about its mounting pin 17, separating the end portion 23 of the latch from the end portion 3 of the firing spring 1. The resulting release of the firing spring 1 allows it to rapidly swing to the firing or impacting position, shown in the drawing in dash-dotted lines; whereupon, the hammer 7 sharply strikes the anvil end portion 27 of the piezoelectric generator 9 to induce a mechanical shock in the piezoelectric crystal 25. The induced mechanical shock is sufficient to cause the crystal 25 to produce an electrical pulse which is transmitted along the electrical leads 37 and 39 to the electrical contacts 41 and 43 in the flash-receiving socket 45. The electrical pulse fires the flash unit 63 when present in the flash-receiving socket 45.

The shock wave developed by inducing the mechanical shock in the piezoelectric crystal 25 is transmitted through the anvil end portion 29 of the crystal to the nose portion 61 of the shutter blade 53. This actuates the shutter blade 53 to pivot in a counterclockwise direction about its mounting pin 55 from the closed position, shown in the drawing in solid lines, to either of the opened positions, shown in dash-dotted lines and in dashed lines, and, thereby, initiates a film exposure by uncovering the exposure aperture 57. If the flash unit 63 is not inserted in the flash-receiving socket 45, the adjustable rebound stop 59 remains in its non-flash position, shown in solid lines. Accordingly, the actuated shutter blade 53 will rebound off the nose portion 87 of the adjustable rebound stop 79 and, thence, is pivoted clockwise about the mounting pin 55 to its closed position by the return spring 59. In the closed position, the shutter blade 59 again covers the exposure aperture 57 to terminate the exposure interval. If, the flash unit 63 has been inserted in the flash-receiving socket 45 to pivot the adjustable rebound stop 79 to its flash position, shown in dash-dotted lines, the actuated shutter blade 53 will be permitted further travel—to increase the exposure interval—before rebounding off the fixed stop 89 and, thence, returning to the closed position. When the shutter blade 53 is returned to the closed position by the spring 59, its nose portion 61 strikes the anvil end portion 29, but with insufficient force to cause the piezoelectric crystal 25 to produce a flash firing electrical pulse.

Known means (not shown) may be included in the camera for returning the piezoelectric firing spring 1 to the cocked or tensioned position, shown in solid lines, during a selected portion of the operating cycle of the camera. For example, the firing spring 1 may be returned by a lever movable by engagement with a film advancing mechanism in the camera. As the firing spring 1 is returned to the cocked or tensioned position, its end portion 3 will contact a cam surface 97 on the end portion 23 of the latch 15. The latch 15 is then pivoted by the end portion 3 of the firing spring 1 in a clockwise direction about the mounting pin 17 to permit re-engagement of the latch end portion 23 with the spring end portion 3.

Although the drawing shows the shutter blade 53 disposed for actuation by a mechanical shock received from the piezoelectric generator 9 when the generator is struck by the hammer 7, it will be appreciated by those having ordinary skill in the art that other embodiments for actuating the shutter blade are possible in accordance with the teachings of the present invention. For example, the piezoelectric generator 9 may be included on the end portion 3 of the firing spring 1 in place of the hammer 7. As a result, the piezoelectric generator 9 will strike and, thereby, actuate the shutter blade 53 to initiate a film exposure and, by that action, produce an electrical pulse for flash firing, when the firing spring 1 is released by the latch 15. According to another example, the piezoelectric generator 9 may be attached to the shutter blade 53 for movement with the blade in response to being struck by the hammer 7.

It will be appreciated that, although the drawing shows a shutter mechanism 50 which includes a single rebound type shutter blade 53, other shutter arrangements are possible using the present invention. The present invention has been described in detail with particular reference to a preferred embodiment thereof, but it will be understood that variations and modifications can be effected within the spirit and scope of the invention.

We claim:

1. In photographic camera apparatus of the type wherein (a) a shutter member is actuatable to initiate a film exposure and (b) a piezoelectric generator receives a mechanically induced shock to produce an electrical pulse for flash firing, the improvement comprising:

means disposing said piezoelectric generator in shock transferring relationship with said shutter member;

means mounting said shutter member for actuation by a mechanical shock received from said piezoelectric generator; and means for striking said piezoelectric generator to mechanically induce a shock in said generator for producing an electrical pulse for flash firing whereby said shock is transmitted by said piezoelectric generator to said shutter member for actuating said shutter member to initiate a film exposure.

2. In photographic camera apparatus of the type wherein (a) a shutter blade is movable between a closed position covering an exposure aperture and an opened position uncovering the exposure aperture and (b) a piezoelectric generator receives a mechanically induced shock to produce an electrical pulse for flash firing, the improvement comprising:

means disposing said piezoelectric generator for contact with said shutter blade in its closed position to transmit a mechanical shock to said shutter blade for moving said blade to its open position; and means for urging said shutter blade to its closed position in contact with said piezoelectric generator.

3. In photographic camera apparatus of the type wherein (a) a shutter blade is movable between a closed position covering an exposure aperture and an opened position uncovering the exposure aperture and (b) a piezoelectric generator receives a mechanically induced shock to produce an electrical pulse for flash firing, the improvement comprising:

said piezoelectric generator having an anvil end portion for receiving a mechanical shock and an opposite end portion disposed for contact with said shutter blade in its closed position to transmit the mechanical shock to said shutter blade;

means mounting said shutter blade for movement to its opened position in response to said blade receiving a mechanical shock from said opposite end portion of said piezoelectric generator;

means for striking said anvil end portion of said piezoelectic generator to produce an electrical pulse for flash firing and to move said shutter blade to its opened position; and means for returning said shutter blade to its closed position in contact with said opposed end portion of said piezoelectric generator.

* * * * *